United States Patent [19]
Reske et al.

[11] 3,876,585
[45] Apr. 8, 1975

[54] TRANSPARENT POLYAMIDES FROM A MIXTURE OF BIS-(AMINOMETHYL) NORBORNANES

[75] Inventors: Eckart Reske, Hofheim, Taunus; Ludwig Brinkman, Frankfurt, am Main; Hartmut Fischer, Kelkheim, Taunus; Freimund Rohrscheid, Frankfurt, am Main, all of Germany

[73] Assignee: Hoechst Aktiengesellschaft, Frankfurt, am Main, Germany

[22] Filed: Nov. 14, 1972

[21] Appl. No.: 306,202

[30] Foreign Application Priority Data
Nov. 16, 1971 Germany............................ 2156723

[52] U.S. Cl....... 260/78 R; 260/33.4 P; 260/47 CZ; 260/65; 260/78 A; 260/78 L
[51] Int. Cl............................................ C08g 20/20
[58] Field of Search .................................... 260/78 R

[56] References Cited
UNITED STATES PATENTS
3,301,827   1/1967   Martin ............................... 260/78 R
3,787,371   1/1974   Brinkmann et al. ............... 260/78 R Primary Examiner—Harold D. Anderson
Attorney, Agent, or Firm—Curtis, Morris & Safford

[57] ABSTRACT

There are disclosed and claimed novel polyamides having improved properties such as high transparency and second order transition temperatures in combination with good mechanical and electrical properties at relatively high temperatures. These polyamides are derived from bis-aminomethyl-norbonanes and aliphatic or cycloaliphatic or aromatic or aromaticaliphatic diamines, aliphatic or aromatic dicarboxylic acids. and amino carboxylic acids.

11 Claims, No Drawings

TRANSPARENT POLYAMIDES FROM A MIXTURE OF BIS-(AMINOMETHYL) NORBORNANES

The present invention relates to transparent polyamides and to a process for their preparation.

Polyamides prepared from aliphatic diamines and dicarboxylic acids have been known for a long time. Numerous polyamides are crystalline. The crystalline products cannot be used anywhere where transparency is necessary. Other polyamides are amorphous. Their melting point is relatively low any they have low second order transition temperatures. These polyamides lend themselves well to the making of sheets, strips, plates, tubes, wire coverings and to various injection molded articles. However, they can only be used at low temperatures on account of their low second order transition temperatures, which greatly limits their usefulness.

In U.S. Pat. Nos. 2,666,748 and 2,666,780 two polyamides prepared from isomeric diamines of the formulae

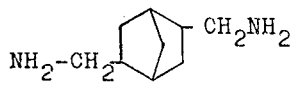 and 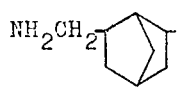

and adipic acid or terephthalic acid are described. Both polyamides are transparent and have relatively high second order transition temperatues. On account of their slight toughness the usefulness of these polyamides is, however, very limited.

A process for the preparation of transparent polyamides by polycondensation of diamines and dicarboxylic acids or their amide-forming derivatives in the known way and under the usual conditions has now been found, which comprises using:

a. mixtures of isomeric bis-aminomethyl-norbornanes of the formulae

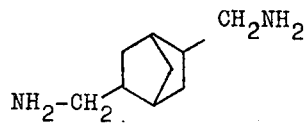 and 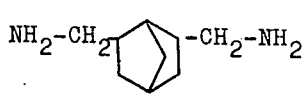

b. one or several aliphatic or cycloaliphatic dicarboxylic acid(s) with 2 to 20 carbon atoms or aromatic dicarboxylic acid(s) with 7 to 20 carbon atoms or mixtures of these acids, and c. one or more aliphatic or cycloaliphatic diamine(s) with 2 to 20 carbon atoms or aromatic diamine(s) with 6 to 20 carbon atoms or aromatic-aliphatic diamine(s) with 7 to 20 carbon atoms or mixtures of these diamines or d. one or more aminocarboxylic acid(s) or their lactam(s) or one or more of the diamines named under c) and one or more aminocarboxylic acid(s) or their lactam(s).

The bis-amino-methyl-norbornanes used for the preparation of the polyamides of the invention can be prepared simply from cheap starting materials, such as described for example in U.S. Pat. No. 2,666,748, 2,666,780 and 3,143,570.

As aliphatic or cycloaliphatic dicarboxylic acids those are used which have 2 to 20 carbon atoms; above all compounds of the general formula $$HOOC - (CH_2)_m - COOH$$

wherein $m$ is an integer of from 0 to 10, are suitable as aliphatic dicarboxylic acids; as cycloaliphatic dicarboxylic acids are suitable the stereoisomeric 1,3-cyclopentanedicarboxylic acids, 1,3- and 1,4-cyclohexane-dicarboxylic acids and 4,4'-dicyclohexyldicarboxylic acids. Adipic acid is especially suitable.

As aromatic dicarboxylic acids those with 7 to 20, preferably 8 to 15 carbon atoms, are used, for example mononuclear dicarboxylic acids of the benzene series, 3,5-pyridinedicarboxylic acid, 1,4-, 1,5- and other naphthalene dicarboxylic acids, 4,4'-diphenyldicarboxylic acid, diphenyl-sulfone dicarboxylic acids and benzophenone dicarboxylic acids, especially terephthalic acid and isophthalic acid.

Mixtures of two or more of the dicarboxylic acids named can also be used.

As aliphatic and cycloaliphatic diamines those with 2 to 20 carbon atoms can be used; above all compounds of the general formula $$NH_2 - (CH_2)_n - NH_2$$

wherein $n$ is an integer of from 2 to 12, are suitable as aliphatic diamines; the stereoisomeric 1,3- and 1,4-bis-aminomethylcyclohexanes, trans-1,2-bis-aminomethyl-cyclobutane, -cyclopentane and -cyclohexane are suitable as cycloaliphatic diamines. Especially suitable are ethylene diamine, hexamethylene diamine and 2-methyl-pentamethylene diamine.

As aromatic diamines those with 6 to 20, preferably 6 to 15, carbon atoms, are used, above all mononuclear diamines of the benzene series, 4,4'-, 3,4'-diamino-diphenyl and other diamino-diphenyls, diamino-diphenylmethanes, diaminodiphenyl-propanes, diaminodiphenyl ethers and diaminodiphenylsulfones, especially m- and p-phenylene diamine.

As aromatic-aliphatic diamines those with 7 to 20 carbon atoms having the general formula $$NH_2-R-Ar-R-NH_2$$

are used, wherein R signifies a single chemical bond or identical or different alkylene groups with 1 to 8 carbon atoms and Ar is a bivalent aromatic, optionally alkyl-substituted radical, for example m- and p-xylylene diamine, 2,5-dimethyl-p-xylylene diamine and 2,4-dimethyl-m-xylylene diamine.

The maximum quantity of diamines, which can be polycondensed without the polyamide losing its transparency, depends on the number of the diamines added and on their nature.

Aliphatic diamines with branched carbon structure and also diamines, of which the carbon structure contains one or several cyclo-aliphatic radicals, can be incorporated by polycondensation in a greater quantity than those with straight-chain or aromatic carbon structure. Furthermore, a mixture of various diamines can be incorporated by polycondensation in a great quantity than a single diamine.

In general it is possible to add up to 80 mol-%, preferably 50 mol-% (calculated on the total diamine mixture), of other diamines, without the polyamide losing its transparency.

As amino carboxylic acids those with 2 to 20 carbon atoms can be used, above all compounds of the general formula $$NH_2 - (CH_2)_p - COOH$$

$(p = 1$ to $11)$ especially amino-pivalic acid, ω-amino-caproic acid and ω-aminododecanoic acid.

Also aromatic or aliphatic-aromatic amino-carboxylic acids of the formula $$NH_2-R'-AR-COOH,$$

can be used wherein R' is a single chemical bond or an alkylene group with 1 to 8 carbon atoms and Ar is a bivalent, aromatic radical, which may be substituted by alkyl, m- and p-amino-benzoic acid are especially preferred.

Mixtures of two or more of these amino-carboxylic acids can be used also.

The maximum quantity of amino-carboxylic acids, which can be incorporated by polycondensation without the polyamide losing its transparency depends on the number of the aminocarboxylic acids added and on their nature.

Aliphatic amino-carboxylic acids with branched carbon structure and also amino-carboxylic acids, of which the carbon structure contains one or several cycloaliphatic radicals, can be incorporated by condensation in a greater quantity than those with straight-chain or aromatic carbon structure. Furthermore, a mixture of various amino carboxylic acids can be incorporated by polycondensation in a greater quantity than an individual amino-carboxylic acid. As shown in the Examples given below, the second order transition temperature may vary from about 68°C. to about 173°C.

In general it is possible to add up to 80 per cent by weight, preferably up to 60 per cent by weight (calculated on the total mixture of the starting materials), of amino carboxylic acids, without the polyamide losing its transparency.

The polyamides of the invention can be prepared in the known way by melt condensation.

The diamine mixture and the dicarboxylic acids in stoichiometric quantities or in approximately stoichiometric quantities possibly with the addition of water and/or acetic acid, or also the salts of the diamines and the dicarboxylic acids and an addition of amino-carboxylic acids or their lactams are put in an autoclave with stirrer, the mixture is melted, the steam is drawn off after some time, the mixture is stirred for some time in the inert gas stream and then polycondensed further in the vacuum, until the desired molecular weight is obtained.

The reduced specific viscosities of the polyamides should be in a range of from 0.5 dl/g to 4 dl/g (measured with solutions of 1 g of polyamide in 100 ml of phenol-tetrachlorethane (in the weight proportion 3 : 2) at 25°C), preferably of from 1 dl/g to 2.5 dl/g.

In the melt condensation also amide-forming derivatives of the starting materials can be used: ie. in place of the dicarboxylic acids their esters or amides, in place of the diamines their amides or isocyanates, or in place of the amino-carboxylic acids their lactams.

The polyamides of the invention are highly transparent and possess relatively high second order transition temperatures. The various components of the diamine mixture influence the properties of the polyamides in such a way that no crystallization takes place. On the other hand the individual components of this diamine mixture astonishingly do not have the undesired effect of reducing the second order transition temperatures of the polyamides of the invention to too great an extent.

Some of the polyamides of the invention, for example the one from the diamine mixture of the invention and terephthalic acid with the addition of 70 per cent by weight ε-caprolactan (calculated on the total mixture of the starting materials), become cloudy due to slight crystallization when they are cooled slowly from the melt. However, transparent molded articles are also obtained from them if cooling is carried out quickly at temperatures of below the glass temperatures after the thermoplastic shaping has taken place, for example by injection molding with the aid of injection molding machines into cold molds.

The polyamides of the invention can be used everywhere where transparency and good mechanical as well as electrical properties at relatively high temperatures are necessary.

The polyamides can be processed, for example, into sheets, plates, tubes, wire coverings and by injection molding into technical parts.

Molded articles prepared from the polyamides of the invention possess improved impact strength.

The following Examples illustrate the invention. The viscosity mearurements were carried out at 25°C with solutions of 1 g of polyamide in 100 ml of phenol-tetrachlorethane (in the weight proportion of 60 : 40). The second order transition temperatures were determined by differential thermo-analysis at a heating speed of 4°C/min.

EXAMPLE 1

For the preparation of the salts

A: 154.26 g of bis-amino-methyl-norbornane mixture and 166.13 g of isophthalic acid B: 116.21 g of 2-methylpentamethylene diamine and 166.13 g of terephthalic acid are heated to boiling in each case with 2 of ethanol for 1 hour, water is added slowly until clear solutions are formed, the solvent is drawn off in the water jet vacuum and the mixture is dried for 12 hours in the drying cabinet.

For the polycondensation 200 g of salt A and 100 g of salt B are placed in an autoclave, the air is displaced with nitrogen, the autoclave is evacuated and sealed. The mixture is melted at 280°C, stirred for 30 minutes at this temperature, the pressure is released in the course of 1 hour, nitrogen is passed through the apparatus and the mixture stirred for 1 hour. Subsequently pressure is reduced to 0.1 mm of mercury, and the mixture is stirred for 1 hour at 280°C.

The polyamide is transparent and has a reduced specific viscosity of 1.2 dl/g. Its second order transition temperature is 173°C.

EXAMPLE 2:

200 g of salt A as in Example 1 and 50 g of ε-caprolactam are polycondensed, as described in Example 1, at 280°C.

The polyamide is transparent and has a second order transition temperature of 166°C. The reduced specific viscosity is 1.5 dl/g.

EXAMPLE 3:

As described in Example 1, a salt C is prepared from 154.26 g of bis-amino-methyl-norbornane mixture and 166.13 g of terephthalic acid. 100 g of the salt and 50 g of ε-caprolactam are polycondensed at 280°C, as described in Example 1.

The polyamide is transparent and has a reduced specific viscosity of 2.2 dl/g and a second order temperature of 140°C.

EXAMPLE 4

As described in Example 1, 100 g of salt C (Example 3) and 70 g of ε-caprolactam are polycondensed at 280°C.

The polyamide is transparent and has a reduced specific viscosity of 2.1 dl/g and a second order temperature of 125°C.

EXAMPLE 5:

As described in Example 1, 100 g of salt C (Example 3) and 90 g of ε-caprolactam are polycondensed at 280°C.

The polyamide is transparent and has a reduced specific viscosity of 1.9 dl/g and a second order transition temperature of 113°C.

EXAMPLE 6:

As described in Example 1, 100 g of salt C (Example 3) and 233 g of ε-caprolactam are polycondensed at 280°C.

The polyamide is cloudy and has a reduced specific viscosity of 2.0 dl/g and a second order transition temperature of 68°C.

A transparent product is obtained through quick cooling after polycondensation of a parallel test mixture.

What is claimed is:

1. A transparent polyamide having a reduced specific viscosity of 0.5 to 4.0 dl/g, measured at a 1% concentration of the polyamide in phenol/tetrachloroethane in a weight ratio of 3:2 at 25°C., said polyamide consisting essentially of the polymeric polycondensation product of
   a. a mixture of bis-aminomethyl norbornanes of the formulae

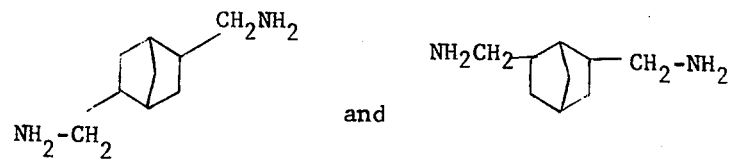

and b. one or more aromatic carbocyclic dicarboxylic acids of 7 to 20 carbon atoms and
   c. up to 80% by weight, based on the total weight of starting materials, of one or more amino-carboxylic acids or their lactams.

2. A polyamide according to claim 1 wherein component (c) is one or more amino-carboxylic acids containing 2 to 20 carbon atoms or their lactams.

3. A polyamide according to claim 1 wherein component (c) is one or more amino carboxylic acids of the general formula $$NH_2-(CH_2)_p-COOH$$

wherein p is an integer of from 1 to 11.

4. A polyamide according to claim 1 wherein component (c) is epsilon-caprolactam.

5. A transparent polyamide having a reduced specific viscosity of 0.5 to 4.0 dl/g, measured at a 1% concentration of the polyamide in phenol/tetrachloroethane in a weight ratio of 3:2 at 25°C., said polyamide consisting essentially of the polymeric polycondensation product of a. a mixture of bis-amino-methyl norbornanes of the formulae

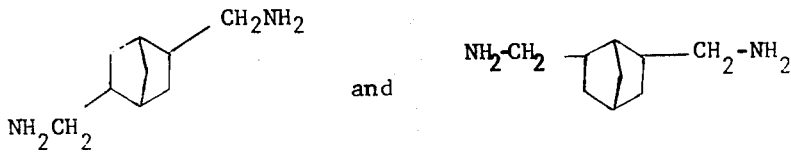

b. one or more aromatic carbocyclic dicarboxylic acids of 8 to 15 carbon atoms,
   c. up to 80 mole percent, based on the total diamine mixture, of one or more branched chain aliphatic diamines of 2 to 20 carbon atoms, or
   d. up to 80% by weight, based on the total weight of starting materials, of one or more aminocarboxylic acids or their lactams or
   e. a mixture of components (c) and (d), said polyamide having a second order transition temperature of about 68°C. to about 173°C.

6. A transparent polyamide having a reduced specific viscosity of 0.5 to 4.0 dl/g, measured at a 1% concentration of the polyamide in phenol/tetrachloroethane in a weight ratio of 3:2 at 25°C., said polyamide consisting essentially of the polymeric polycondensation product of
   a. a mixture of bis-amino-methyl norbornanes of the formulae

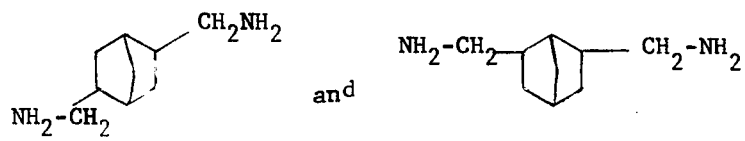

b. one or more phthalic acids, and
   c. up to 80%, based on the total weight of starting materials of a lactam of an amino carboxylic acid.

7. A polyamide according to claim 6 wherein the phthalic acid is terephthalic acid.

8. A polyamide according to claim 6 wherein the phthalic acid is isophthalic acid.

9. A polyamide according to claim 6 wherein the lactam is epsilon-caprolactam.

10. A polyamide according to claim 5 wherein said branched chain diamine is 2-methyl-pentamethylene diamine.

11. A transparent polyamide having a reduced specific viscosity of 0.5 to 4.0 dl/g, measured at a 1% concentration of the polyamide in phenol/tetrachloroethane in a weight ratio of 3:2 at 25°C., said polyamide consisting essentially of the polymeric polycondensation product of a. a mixture of bis-amino-methyl norbornanes of the formulae

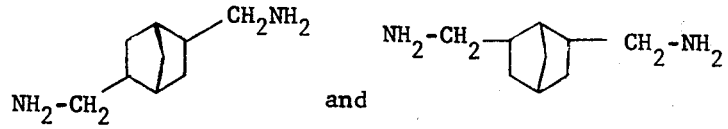

and b. one or more aromatic carbocyclic dicarboxylic acids of 8 to 15 carbon atoms, and c. up to 80%, based on the total weight of starting material, of an amino carboxylic acid of the formula

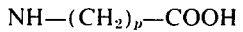

wherein $p$ is an integer of from 1 to 11 or its lactam.

* * * * *